US005426369A

United States Patent [19]

Brinker

[11] Patent Number: 5,426,369

[45] Date of Patent: Jun. 20, 1995

[54] SPARK PLUG TESTING APPARATUS

[76] Inventor: Reiner G. Brinker, 5424 Camille Dr., Mechanicsville, Va. 23111

[21] Appl. No.: 113,050

[22] Filed: Aug. 31, 1993

[51] Int. Cl.[6] .................... G01M 19/02

[52] U.S. Cl. .................... 324/400; 324/397; 73/116

[58] Field of Search .................... 324/393, 396, 397, 400; 215/101; 73/116, 118.1, 119 R

[56] References Cited

U.S. PATENT DOCUMENTS

| | | | |
|---|---|---|---|
| 1,345,337 | 7/1920 | Ainge | 324/393 |
| 1,385,222 | 7/1921 | Miller | 324/397 |
| 1,422,742 | 7/1922 | Cook | 324/397 |
| 1,457,234 | 5/1923 | Strout | 324/400 |
| 1,521,041 | 12/1924 | Opsahl | 324/400 |
| 1,663,130 | 3/1928 | Houghton | 324/397 |
| 1,713,373 | 2/1926 | Burger | 324/397 |
| 4,490,677 | 12/1984 | Risner | 324/400 |
| 4,746,868 | 5/1988 | Davis | 324/400 |

*Primary Examiner*—Sandra L. O'Shea
*Assistant Examiner*—R. Phillips

[57] ABSTRACT

A new and improved spark plug testing apparatus is in the form of an electrically conductive, metallic spring clip and includes a pair of first electrically conductive contact portions for contacting an electrically conductive externally threaded portion of a spark plug. A first resilient portion is connected to the pair of first electrically conductive contact portions for clamping the first electrically conductive contact portions onto the electrically conductive externally threaded portion of the spark plug. A pair of second resilient portions is connected to the respective first electrically conductive contact portions, and a pair of second electrically conductive contact portions is connected to the respective second resilient portions, such that the first resilient portion urges the second electrically conductive contact portions onto an electrically conductive internally threaded portion of a spark plug receiving aperture on an internal combustion engine. Inwardly bent ends are located at respective ends of the second electrically conductive portions for facilitating insertion of the second electrically conductive contact portions into the spark plug receiving aperture of the engine. A holder assembly, which includes a spark plug socket portion, may be connected to the first resilient portion of the spring clip. A handle assembly is received by the holder assembly and includes a pair of retention brackets for retaining the holder assembly when the handle portion is disconnected from the spark plug socket portion. The handle assembly may include an assembly of feeler gauges, a brush, and a magnifying lens.

2 Claims, 4 Drawing Sheets

FIG 3
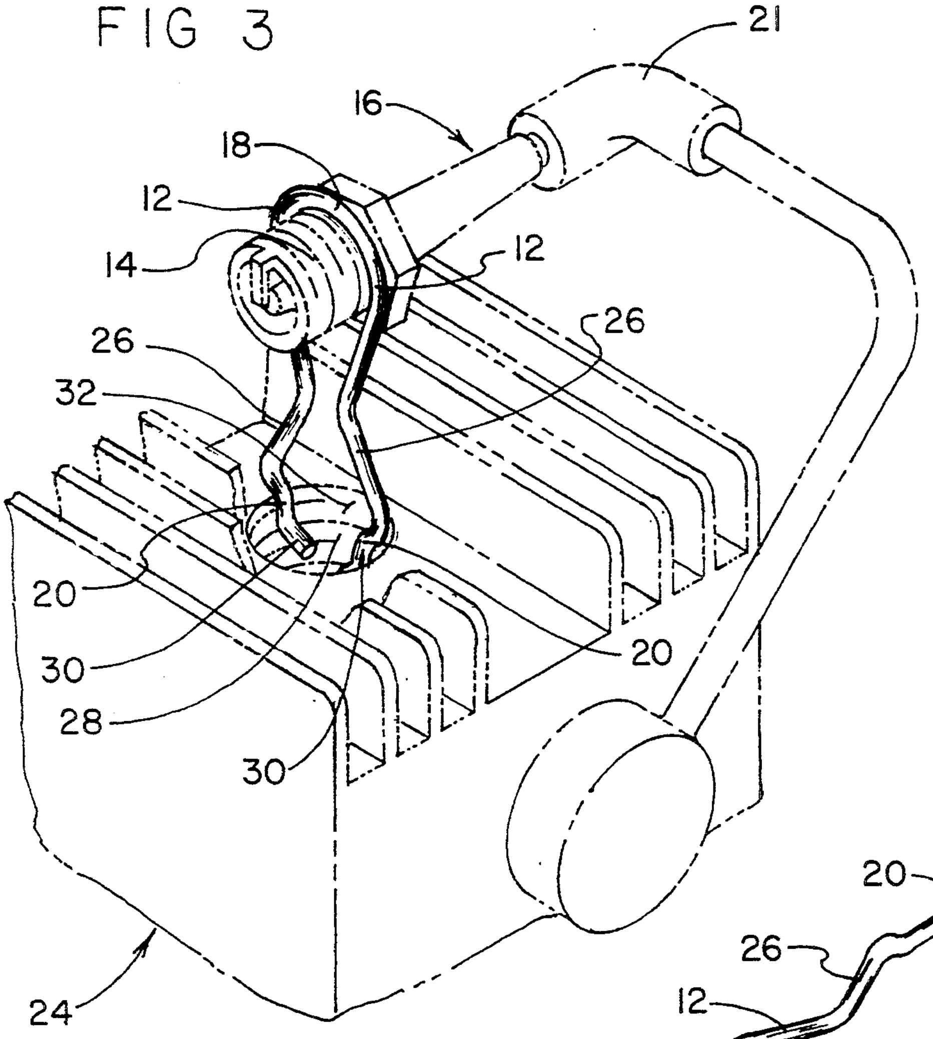
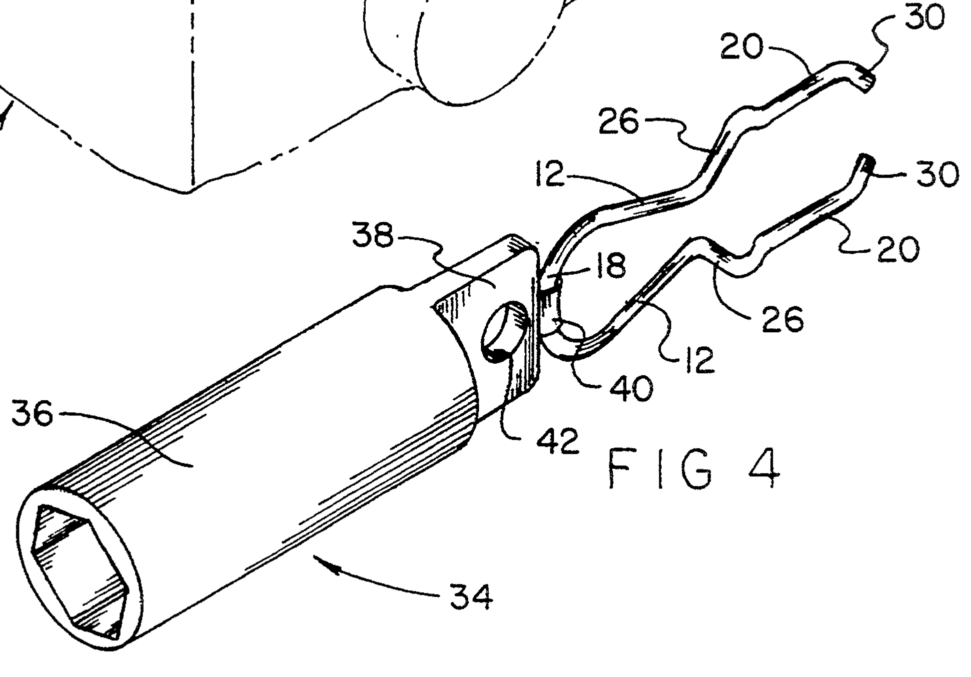
FIG 4

SPARK PLUG TESTING APPARATUS

BACKGROUND OF THE INVENTION

1. Field of the Invention

The present invention relates generally to devices for testing spark plugs used in internal combustion engines, and, more particularly, to a device which permits testing a spark plug that is in present in the electrical circuitry of the internal combustion engine.

2. Description of the Prior Art

The performance of an internal combustion engine depends upon a number of factors, and one major factor is the proper performance of the engine's electrical system. A key component of the electrical system is the spark plug. In conjunction with the spark plug, there are other electrical components that comprise the circuitry that supplies the electrical energy to the spark plug for effecting the spark.

When engine problems develop or when an engine tune up is carried out, it is often important to test the spark plugs to see if they are producing a spark. Throughout the years, a number of innovations have been developed relating to testing spark plugs. One way of testing a spark plug is to disconnect the spark plug from its associated circuitry, to remove the spark plug from the engine, and to test the spark plug on a device that is independent of the engine. A patent disclosing this approach is U.S. Pat. No. 4,156,839. This approach may adequately test the spark plug itself, but it provides no indication as to whether the circuitry on the engine that is supposed to provide electrical energy to the spark plug on the engine is adequately supplying that energy to the spark plug. In this respect, it would be desirable if a spark plug testing device were provided which indicates whether the circuitry that is supposed to supply electrical energy to the spark plug is actually providing energy to the spark plug.

Additional innovations have been developed throughout the years that permit evaluation of a spark plug on the engine as it is connected to the electrical circuitry that energizes the spark plug. The following U.S. patents are representative of some of those innovations: U.S. Pat. Nos. 4,291,383; and 4,825,167. Both of these patents have a common characteristic; that is, both of these patents disclose complex electronic testing circuitry and equipment for carrying out the tests. In their complexity, the devices disclosed in both of these patents test and measure a number of electrical properties of the electrical circuitry that go far beyond whether the spark plug is actually sparking while on the engine and connected to its energizing circuitry. In this respect, it would be desirable if a spark plug testing device were provided which does not have complex electrical circuitry. Furthermore, in this respect, it would be desirable if a spark plug testing device were provided which does not test and measure electrical properties that go far beyond simply whether the spark plug is actually sparking while on the engine and connected to its energizing circuitry.

In addition, the following U.S. patents disclose some additional innovations associated with spark plugs or wiring for internal combustion engines: U.S. Pat. No. 3,910,541.; and U.S. Pat. Des. No. 265,381. More specifically, U.S. Pat. No. 3,910,541 discloses a holder for a spare spark plug, wherein the holder is attached to an electrical wire on the engine. U.S. Pat. Des. No. 265,381 discloses a wire clip.

Still other features would be desirable in a spark plug testing apparatus. Rather than using complex electronic testing equipment, it would be desirable if a spark plug testing apparatus permitted the use of the human eye to test for the presence of a spark in the spark plug.

Generally, a spark plug has a round threaded portion that screws into a complementary threaded orifice in the internal combustion engine. There are a number of purposes that the threaded connection between the threaded connections on the spark plug and the engine serve. First, the threaded connection physically supports the spark plug on the engine. Second, the threaded connection provides an gas-tight seal to keep combustion gases from leaking out of the engine cylinder. Third, the threaded connection provides an electrical contact between the spark plug and the engine which is at electrical ground. To test the electrical characteristics of the spark plug in its energizing circuitry, it is important that a good electrical connection be maintained between the spark plug and the engine. In this respect, it would be desirable if a spark plug testing device were provided which maintained a good electrical connection between the spark plug and the engine.

When an engine and a spark plug are cold before running, high temperatures do not prevent a person from handling the spark plug or contacting the engine. However, once the engine has been operating, intense heat builds up very rapidly, especially on spark plugs which are exposed to the internal combustion in the engine. In this respect, it would be desirable if a spark plug testing device were provided which precluded the necessity of a person's hands from directly touching a spark plug that is hot after the engine has been running.

In order to remove or install a spark plug from or to an internal combustion engine, a spark plug socket is usually employed. In this respect, it would be desirable if a spark plug testing device were provided which is combined with a spark plug socket.

To gain leverage for unscrewing and screwing a spark plug out of or into an internal combustion engine, a handle is used with the spark plug socket. In that it would be desirable if the spark plug testing device were combined with a spark plug socket, it would also be desirable if a spark plug testing device were combined with a handle and a spark plug socket.

During a tune up, whether a used spark plug or a new spark plug is installed in the engine, several functions are associated with the spark plug. For example, the proper gap should be set on the spark plug. Also, if the spark plug is a used one, then dirt should be cleaned off of the spark plug, especially in the region of the gap. In this respect, it would be desirable if a spark plug testing device were provided which is combined with devices for measuring the proper gap for the spark plug and for cleaning the spark plug.

Often the spark plug handle and the spark plug socket are disconnected from each other when placed in storage. This is because when the handle and the socket are connected together during use, they form a T-shaped structure which occupies quite a bit of storage space. When they are disassembled for storage, the may be placed side by side to occupy far less storage space. Nevertheless, the separated spark plug socket and the handle may become separated from each other during storage. To keep the spark plug socket, and its associated spark plug testing apparatus, together with the handle during storage, it would be desirable if a connector were provided that connected the spark plug socket with the handle during storage.

A spark plug gap has a relatively small dimension. As such, it may be difficult to readily see with the naked eye. The respective shapes of the two electrodes forming the gap of the spark plug may also be difficult to see with the naked eye. In this respect, it would be desirable if a spark plug testing device were provided which includes a magnifying glass to enable better seeing of the spark plug gap during gapping and cleaning operations.

Thus, while the foregoing body of prior art indicates it to be well known to use devices for testing spark plugs, the prior art described above does not teach or suggest a spark plug testing apparatus which has the following combination of desirable features: (1) indicates whether the circuitry that is supposed to supply electrical energy to the spark plug is actually providing energy to the spark plug; (2) does not have complex electrical circuitry; (3) does not test and measure electrical properties that go far beyond simply whether the spark plug is actually sparking while on the engine and connected to its energizing circuitry; (4) permits the use of the human eye to test for the presence of a spark in the spark plug; (5) maintains a good electrical connection between the spark plug and the engine; (6) precludes the necessity of a person's hands from directly touching a spark plug that is hot after the engine has been running; (7) is combined with a spark plug socket; (8) is combined with a handle and a spark plug socket; (9) is combined with devices for measuring the proper gap for the spark plug and for cleaning the spark plug; (10) provides a connector that connects the spark plug socket with the handle during storage; and (11) includes a magnifying glass to enable better seeing of the spark plug gap during gapping and cleaning operations. The foregoing desired characteristics are provided by the unique spark plug testing apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a new and improved spark plug testing apparatus which includes a pair of first electrically conductive contact portions for contacting an electrically conductive externally threaded portion of a spark plug. A first resilient portion is connected to the pair of first electrically conductive contact portions for clamping the first electrically conductive contact portions onto the electrically conductive externally threaded portion of the spark plug. A pair of second electrically conductive contact portions is connected to the respective first electrically conductive contact portions, such that the first resilient portion urges the second electrically conductive contact portions onto an electrically conductive internally threaded portion of a spark plug receiving aperture on an internal combustion engine. The first electrically conductive contact portions, the first resilient portion, and the second electrically conductive contact portions are formed as a one-piece, electrically conductive structure in the form of a clip.

Preferably, a pair of second resilient portions is connected between the respective first electrically conductive contact portions and the respective second electrically conductive contact portions. The second resilient portions are electrically conductive, and the second resilient portions urge the second electrically conductive contact portions onto the internally threaded portion of the spark plug receiving aperture of the internal combustion engine. Preferably, the first electrically conductive contact portions, the first resilient portion, the second resilient portions, and the second electrically conductive contact portions are formed as a one-piece, electrically conductive structure in the form of a clip.

Inwardly bent ends are located at respective ends of the second electrically conductive portions for facilitating insertion of the second electrically conductive contact portions into the spark plug receiving aperture of the internal combustion engine.

A holder assembly is connected to the first resilient portion. The holder assembly includes a spark plug socket portion. A handle receiving portion is connected to the spark plug socket portion, and a connector is connected to the handle receiving portion, for connecting the holder assembly to the first resilient portion.

A handle assembly is received by the handle receiving portion of the holder assembly. The handle assembly includes a handle portion. A pair of retention brackets may be connected to the handle portion. The retention brackets are capable of retaining the holder assembly when the handle portion is disconnected from the handle receiving portion. Each of the retention brackets includes a handle connecting portion for connecting to the handle portion and a socket connecting portion for receiving the spark plug socket portion.

The handle portion may include a central body portion, an assembly of feeler gauges attached to the central body portion, and a brush portion attached to the central body portion. A first cap is capable of being is connected to the central body portion for covering the feeler gauges, and a second cap is capable of being connected to the central body portion for covering the brush portion. The first cap may include a magnifying lens assembly attached thereto.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining at least four preferred embodiments of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

It is therefore an object of the present invention to provide a new and improved spark plug testing apparatus which has all of the advantages of the prior art and none of the disadvantages.

It is another object of the present invention to provide a new and improved spark plug testing apparatus which may be easily and efficiently manufactured and marketed.

It is a further object of the present invention to provide a new and improved spark plug testing apparatus which is of durable and reliable construction.

An even further object of the present invention is to provide a new and improved spark plug testing apparatus which is susceptible of a low cost of manufacture with regard to both materials and labor, and which accordingly is then susceptible of low prices of sale to the consuming public, thereby making such spark plug testing apparatus available to the buying public.

Still yet a further object of the present invention is to provide a new and improved spark plug testing apparatus which indicates whether the circuitry that is supposed to supply electrical energy to the spark plug is actually providing energy to the spark plug.

Still another object of the present invention is to provide a new and improved spark plug testing apparatus that does not have complex electrical circuitry.

Yet another object of the present invention is to provide a new and improved spark plug testing apparatus which does not test and measure electrical properties that go far beyond simply whether the spark plug is actually sparking while on the engine and connected to its energizing circuitry.

Even another object of the present invention is to provide a new and improved spark plug testing apparatus that permits the use of the human eye to test for the presence of a spark in the spark plug.

Still a further object of the present invention is to provide a new and improved spark plug testing apparatus which maintains a good electrical connection between the spark plug and the engine.

Yet another object of the present invention is to provide a new and improved spark plug testing apparatus that precludes the necessity of a person's hands from directly touching a spark plug that is hot after the engine has been running.

Still another object of the present invention is to provide a new and improved spark plug testing apparatus which is combined with a spark plug socket.

Even another object of the present invention is to provide a new and improved spark plug testing apparatus that is combined with a handle and a spark plug socket.

Still a further object of the present invention is to provide a new and improved spark plug testing apparatus that is combined with devices for measuring the proper gap for the spark plug and for cleaning the spark plug.

Yet another object of the present invention is to provide a new and improved spark plug testing apparatus which provides a connector that connects the spark plug socket with the handle during storage.

Still yet a further object of the present invention is to provide a new and improved spark plug testing apparatus that includes a magnifying glass to enable better seeing of the spark plug gap during gapping and cleaning operations.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 3 is a perspective view of the embodiment of the spark plug testing apparatus shown in FIG. 1 installed on a spark plug connected to an internal combustion engine.

FIG. 4 is a perspective view of a second preferred embodiment of the invention in which the spark plug testing apparatus is connected to a spark plug socket.

DESCRIPTION OF THE PREFERRED EMBODIMENT

With reference to the drawings, a new and improved spark plug testing apparatus embodying the principles and concepts of the present invention will be described.

Figure 1:
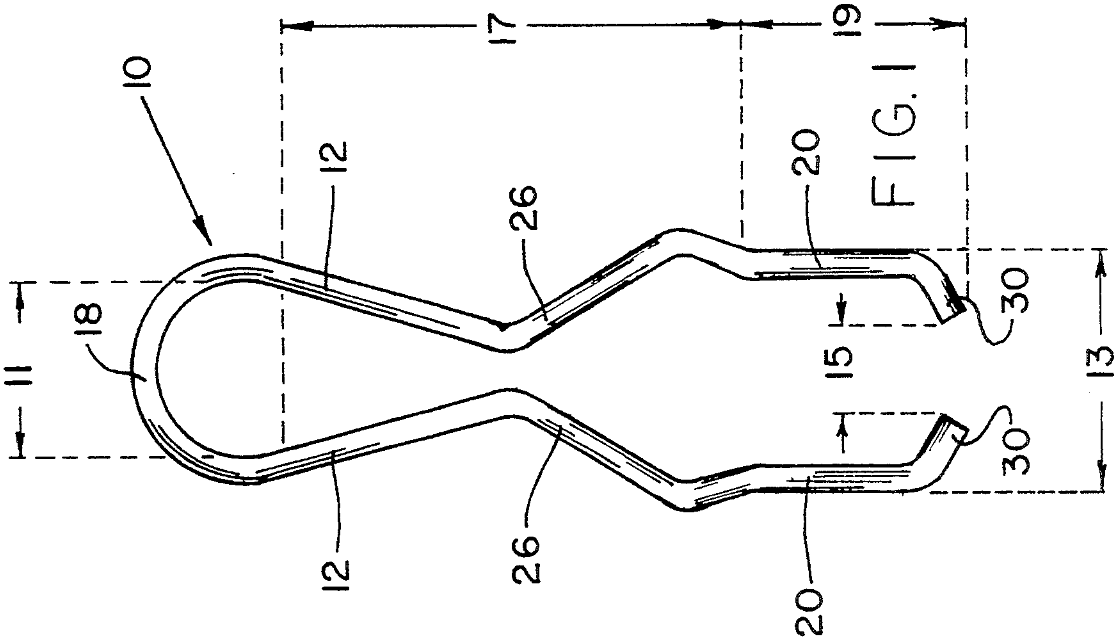
FIG. 1 is a top view of a first preferred embodiment of the spark plug testing apparatus of the invention.
Figure 2:
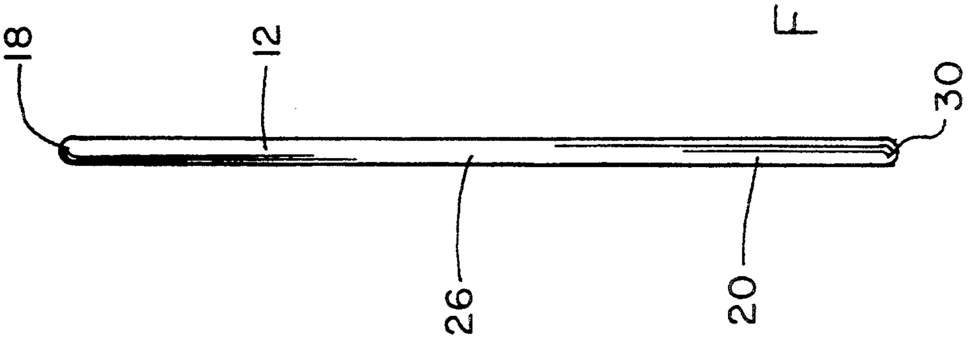
FIG. 2 is a side view of the embodiment of the spark plug testing apparatus of the invention shown in FIG. 1.

Turning initially to FIGS. 1–3, there is shown a first exemplary embodiment of the spark plug testing apparatus of the invention generally designated by reference numeral 10. In its preferred form, spark plug testing apparatus 10 includes a pair of first electrically conductive contact portions 12 for contacting an electrically conductive externally threaded portion 14 of a spark plug 16. A first resilient portion 18 is connected to the pair of first electrically conductive contact portions 12 for clamping the first electrically conductive, contact portions 12 onto the electrically conductive externally threaded portion 14 of the spark plug 16. A pair of second electrically conductive contact portions 20 is connected to the respective first electrically conductive contact portions 12, such that the first resilient portion 18 urges the second electrically conductive contact portions 20 onto an electrically conductive internally threaded portion 28 of a spark plug receiving aperture 32 on an internal combustion engine 24. The first electrically conductive contact portions 12, the first resilient portion 18, and the second electrically conductive contact portions 20 are formed as a one-piece, electrically conductive structure in the form of a metallic spring clip.

Preferably, a pair of second resilient portions 26 are connected between the respective first electrically conductive contact portions 12 and the respective second electrically conductive contact portions 20. The second resilient portions 26 are electrically conductive, and the second resilient portions 26 urge the second electrically conductive contact portions 20 onto the internally threaded portion 28 of the spark plug receiving aperture 32 of the internal combustion engine 24. Preferably, the first electrically conductive contact portions 12, the first resilient portion 18, the second resilient portions 26, and the second electrically conductive contact portions 20 are formed as a one-piece, electrically conductive structure in the form of a metallic spring clip.

More specifically, the spark plug testing apparatus of the invention can be made of approximately 6 inches of 12 Ga. (0.080) steel wire. An alternative wire is uncoated coat hanger wire. The inside dimension 11 can be 17/32 inch. The dimension 13 can be ¾ inch to achieve proper tension in the first resilient portion 18 and the adjacent first electrically conductive contact portions 12 when the second electrically conductive contact portions 20 are inserted in the spark plug receiving aperture 32. The first resilient portion 18 and the first electrically conductive contact portions 12, in combination, can be regarded as an eye. The distance 15 between the inwardly bent ends 30 can be ⅜ inch. The dimension 17 can be 1⅝ inches to clear cooling fins or covers on engines. The distance 19 can be ⅝ inch to prevent contact with pistons and valves in most engines.

Inwardly bent ends 30 are located at respective ends of the second electrically conductive portions 20 for facilitating insertion of the second electrically conductive contact portions 20 into the spark plug receiving aperture 32 of the internal combustion engine 24.

Turning to FIG. 4, a second embodiment of the invention is shown. Reference numerals are shown that correspond to like reference numerals that designate like elements shown in the other figures. In addition, a holder assembly 34 is connected to the first resilient portion 18. The holder assembly 34 includes a spark plug socket portion 36. A handle receiving portion 38 is connected to the spark plug socket portion 36, and a connector 40 is connected to the handle receiving portion 38, for connecting the holder assembly 34 to the first resilient portion 18. The handle receiving portion 38 includes an aperture 42 for receiving a handle.

Figure 6:
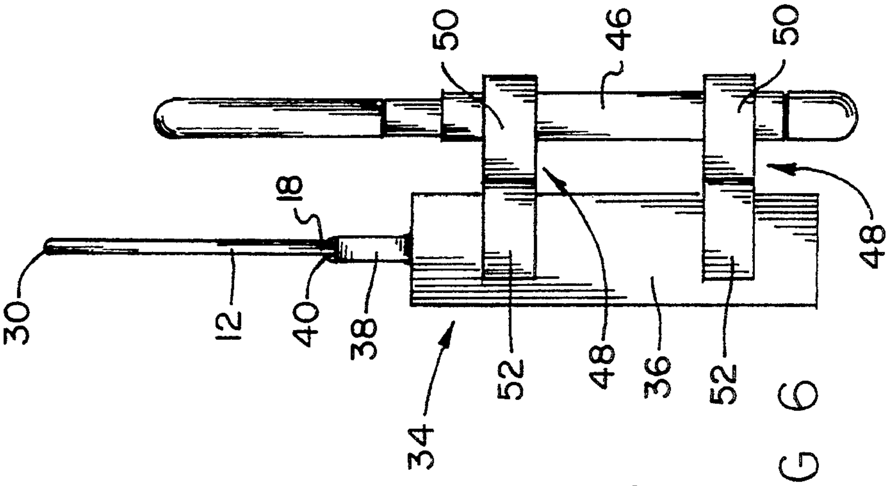
FIG. 6 is a side view of the embodiment of the invention shown in FIG. 5 with the spark plug socket retained by damps attached to the handle.
Figure 5:
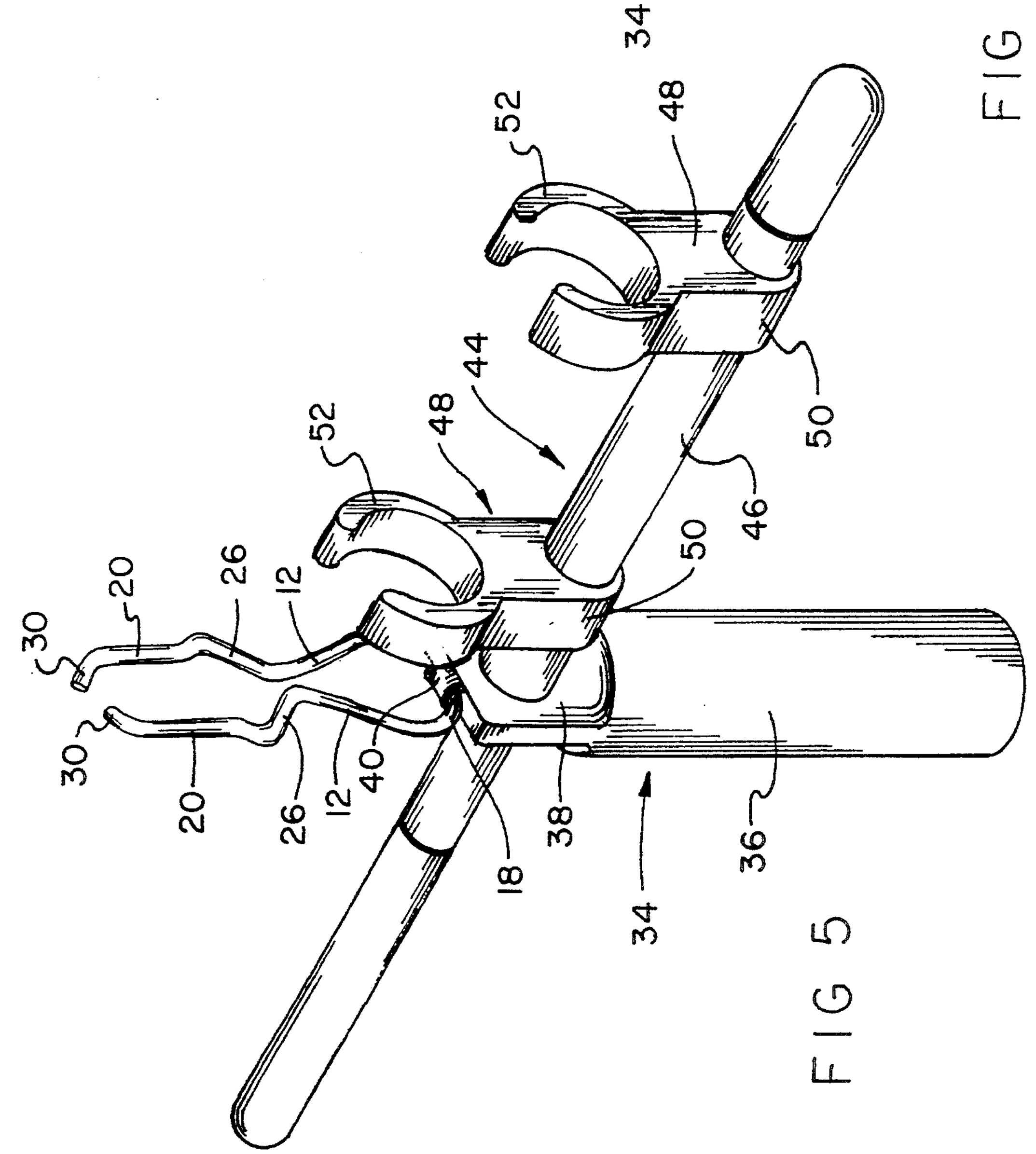
FIG. 5 is a perspective view of a third embodiment of the invention of the spark plug testing apparatus of the invention; wherein the spark plug testing apparatus is connected to a spark plug socket; and wherein a handle is provided for turning the spark plug socket.

Turning to FIGS. 5–6, a third embodiment of, the invention is shown. Reference numerals are shown that correspond to like reference numerals that designate like elements shown in the other figures. In addition, a handle assembly 44 is received by the handle receiving portion 38 of the holder assembly 34. The handle assembly 44 is received in the aperture 42 of the handle receiving portion 38. The handle assembly 44 includes a handle portion 46, and a pair of retention brackets 48 is connected to the handle portion 46. The retention brackets 48 are capable of retaining the holder assembly 34 when the handle portion 46 is disconnected from the handle receiving portion 38. Each of the retention brackets 48 includes a handle connecting portion 50 for connecting to the handle portion 46 and a socket connecting portion 52 for receiving the spark plug socket portion 36.

Figures 7, 8:
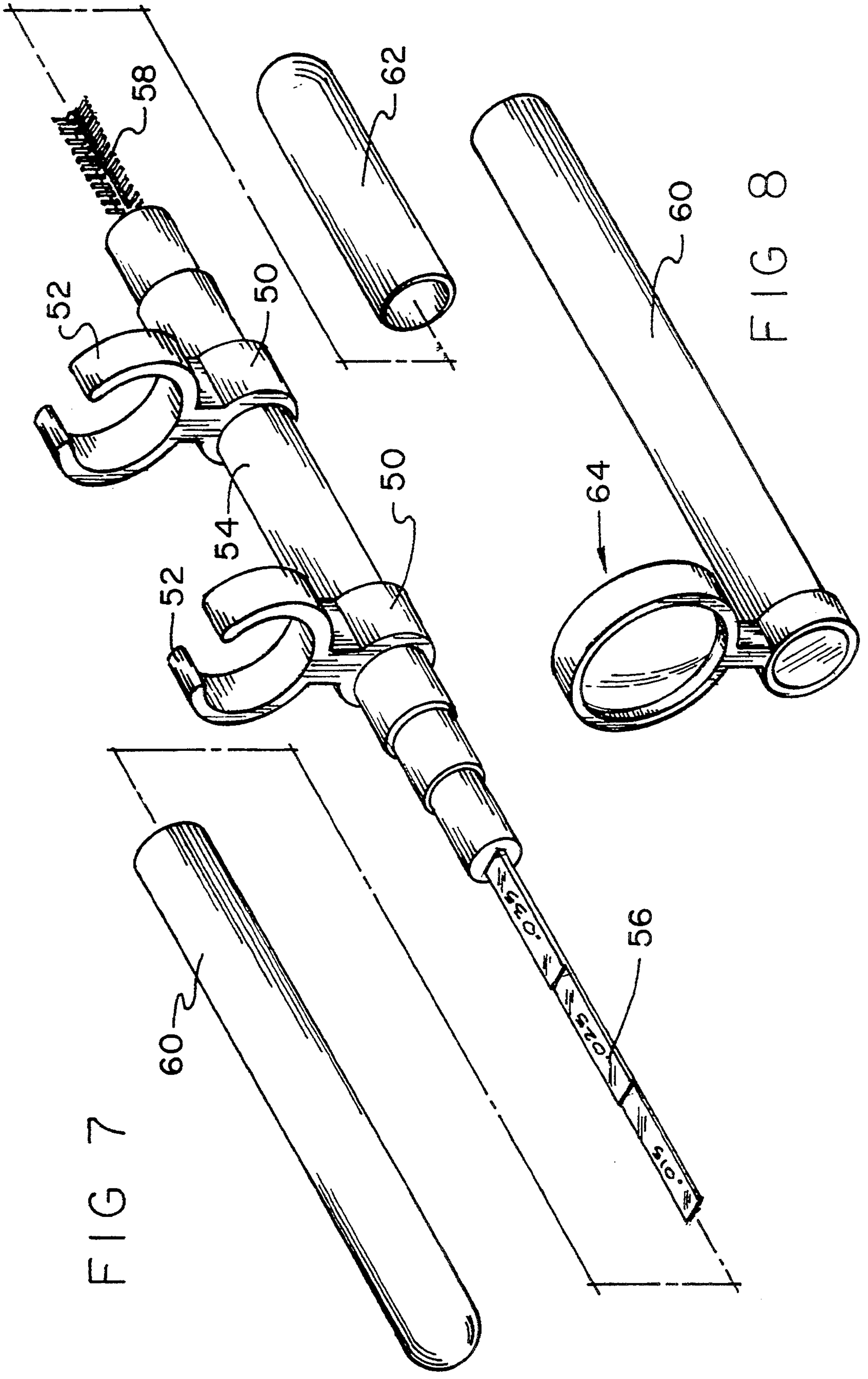
FIG. 7 is an enlarged exploded view of a handle assembly for a spark plug socket for a fourth embodiment of the spark plug testing apparatus of the invention which includes feeler gauges and a spark plug brush retained in the handle assembly.
FIG. 8 is a perspective of an alternative cap for the handle assembly shown in FIG. 7, wherein the alternative cap includes an attached magnifying lens.

Turning to FIGS. 7–8, a fourth embodiment of the invention is shown. Reference numerals are shown that correspond to like reference numerals that designate like elements shown in the other figures. In addition, the handle portion includes a central body portion 54, an assembly of feeler gauges 56 attached to the central body portion 54, and a brush portion 58 attached to the central body portion 54. A first cap 60 is capable of being is connected to the central body portion 54 for covering the feeler gauges 56, and a second cap 62 is capable of being connected to the central body portion 54 for covering the brush portion 58. As shown in FIG. 8, the first cap 60 may also include a magnifying lens assembly 64 attached thereto.

In use, to test a spark plug 16, the connector 21 which is connected to the top of the spark plug 16 is disconnected from the plug. The spark plug 16 is then unscrewed from the internal combustion engine 24. The handle portion 46 and the spark plug socket portion 36 can be used to remove the spark plug 16. After the spark plug 16 is removed from the engine, the feeler gauges 56 and the brush portion 58 can be used to clean and gap the spark plug 16. The magnifying lens assembly 64 can be used to assist in the proper gapping of the spark plug 16. Then, the connector 21 is reconnected to the top portion of the spark plug 16.

The spark plug testing apparatus 10, that is the metallic spring clip of the invention, is connected to the externally threaded portion 14 of spark plug 16 and the internally threaded portion 28 of the engine 24. The spark plug socket portion 36 can be used as a handle for installing the, clip. This may be especially useful if the engine is hot. The first resilient portion 18 squeezes the first electrically conductive contact portions 12 onto the externally threaded portion 14 of the spark plug 16. The second resilient portions 26 spread the second electrically conductive contact portions 20 apart from each other and urge the second electrically conductive contact portions 20 against the internally threaded portion 28 of the internal combustion engine 24. In this way, there is continuous electrical continuity between the externally threaded portion 14 of the spark plug 16 and the internally threaded portion 28 of the internal combustion engine 24.

Then, the engine is started in the usual way, or with a starter switch which permits the engine to be started from under the hood. Then the presence or absence of a spark at the gap of the plug can be observed by the unaided eye. When the spark is present, this indicates that both the spark plug 16 is operating satisfactorily and the wiring and circuitry that supply sparking energy to the plug are also operating properly. Once the spark plug having been tested, the clip 10 can be removed, and reinstalled on another spark plug 16.

If it is noticed that there is no spark at the plug, then the spark plug should be changed. The new spark plug should be tested in the same way. If the new spark plug does not spark, then the electrical system can be checked in a conventional way.

The spark plug testing apparatus 10 of the invention can be used with virtually any type of internal combustion engine 24 and is especially useful for testing spark plugs in small gasoline powered engines such as in lawn mowers, chain saws, hedge trimmers, and the like.

The components of the spark plug testing apparatus of the invention can be made from inexpensive and durable metal materials.

As to the manner of usage and operation of the instant invention, the same is apparent from the above disclosure, and accordingly, no further discussion relative to the manner of usage and operation need be provided.

It is apparent from the above that the present invention accomplishers all of the objects set forth by providing a new and improved spark plug testing apparatus that is low in cost, relatively simple in design and operation, and which may advantageously be used to indicate whether the circuitry that is supposed to supply electrical energy to the spark plug is actually providing energy to the spark plug. With the invention, a spark plug testing apparatus is provided which does not have complex electrical circuitry. With the invention, a spark plug testing apparatus is provided which does not test and measure electrical properties that go far beyond simply whether the spark plug is actually sparking while on the engine and connected to its energizing circuitry. With the invention, a spark plug testing apparatus is provided which permits the use of the human eye to test for the presence of a spark in the spark plug. With the invention, a spark plug testing apparatus is provided which maintains a good electrical connection between the spark plug and the engine. With the invention, a spark plug testing apparatus is provided which precludes the necessity of a person's hands from directly touching a spark plug that is hot after the engine has been running. With the invention, a spark plug testing apparatus is provided which is combined with a spark plug socket. With the invention, a spark plug testing apparatus is provided which is combined with a handle and a spark plug socket. With the invention, a spark plug testing apparatus is provided which is combined with devices for measuring the proper gap for the spark plug and for cleaning the spark plug. With the invention, a spark plug testing apparatus is provided which provides a connector that connects the spark plug socket with the handle during storage. With the invention, a spark plug testing apparatus is provided which includes a magnifying glass to enable better seeing of the spark plug gap during gapping and cleaning operations.

With respect to the above description, it should be realized that the optimum dimensional relationships for the parts of the invention, to include variations in size, form function and manner of operation, assembly and use, are deemed readily apparent and obvious to those skilled in the art, and therefore, all relationships equivalent to those illustrated in the drawings and described in the specification are intended to be encompassed only by the scope of appended claims.

While the present invention has been shown hi the drawings and fully described above with particularity and detail in connection with what is presently deemed to be the most practical and preferred embodiments of the invention, it will be apparent to those of ordinary skill in the art that many modifications thereof may be made without departing from the principles and concepts set forth herein. Hence, the proper scope of the present invention should be determined only by the broadest interpretation of the appended claims so as to encompass all such modifications and equivalents.

What is claimed as being new and desired to be protected by Letters Patent of the United States is as follows:

1. A new and improved spark plug testing apparatus, comprising:

a pair of first electrically conductive contact portions for contacting an electrically conductive externally threaded portion of a spark plug, a first resilient portion connected to said pair of first electrically conductive contact portions for clamping said first electrically conductive contact portions onto the electrically conductive externally threaded portion of the spark plug, a pair of second electrically conductive contact portions connected to said respective first electrically conductive contact portions, such that said first resilient portion urges said second electrically conductive contact portions onto an electrically conductive internally threaded portion of a spark plug receiving aperture on an internal combustion engine, and a pair of second resilient portions connected between said respective first electrically conductive contact portions and said respective second electrically conductive contact portions, said second resilient portions being electrically conductive, and said second resilient portions urging said second electrically conductive contact portions onto the internally threaded portion of the spark plug receiving aperture of the internal combustion engine, wherein said first electrically conductive contact portions, said first resilient portion, said second resilient portions, and said second electrically conductive contact portions are formed as a one-piece, electrically conductive structure in the form of a metallic spring clip.

2. A new and improved spark plug testing apparatus, comprising:

a pair of first electrically conductive contact portions for contacting an electrically conductive externally threaded portion of a spark plug, a first resilient portion connected to said pair of first electrically conductive contact portions for clamping said first electrically conductive contact portions onto the electrically conductive externally threaded portion of the spark plug, a pair of second electrically conductive contact portions connected to said respective first electrically conductive contact portions, such that said first resilient portion urges said second electrically conductive contact portions onto an electrically conductive internally threaded portion of a spark plug receiving aperture on an internal combustion engine, a pair of second resilient portions connected between said respective first electrically conductive contact portions and said respective second electrically conductive contact portions, said second resilient portions being electrically conductive, and said second resilient portions urging said second electrically conductive contact portions onto the internally threaded portion of the spark plug receiving aperture of the internal combustion engine, and inwardly bent ends located at respective ends of said second electrically conductive portions for facilitating insertion of said second electrically conductive contact portions into the spark plug receiving aperture of the internal combustion engine, wherein said first electrically conductive contact portions, said first resilient portion, said second resilient portions, said second electrically conductive contact portions, and said inwardly bent ends are formed as a one-piece, electrically conductive structure in the form of a metallic spring clip.

* * * * *